US006878180B2

United States Patent
Sexton et al.

(10) Patent No.: US 6,878,180 B2
(45) Date of Patent: Apr. 12, 2005

(54) COMBINATION AMMONIUM SULFATE/ DRIFT REDUCING ADJUVANT AND WET BOND PROCESS FOR MAKING THE SAME

(75) Inventors: Franklin Earl Sexton, Richmond, IL (US); Jared Andrew Gratz, Harvard, IL (US); Kenneth Elton Cox, McHenry, IL (US)

(73) Assignee: Exacto, Inc., Richmond, IL (US)

( * ) Notice: Subject to any disclaimer, the term of this patent is extended or adjusted under 35 U.S.C. 154(b) by 314 days.

(21) Appl. No.: 10/035,486

(22) Filed: Oct. 19, 2001

(65) Prior Publication Data

US 2003/0074940 A1 Apr. 24, 2003

(51) Int. Cl.$^7$ .......................... C05C 11/00; C05D 11/00
(52) U.S. Cl. ................................... 71/61; 71/63; 71/27
(58) Field of Search ................................. 71/61, 63, 27

(56) References Cited

U.S. PATENT DOCUMENTS

| | | | | | |
|---|---|---|---|---|---|
| 2,625,471 | A | * | 1/1953 | Mowry et al. ................. 71/1 |
| 5,472,476 | A | * | 12/1995 | Schapira et al. ........... 71/64.12 |
| 5,679,128 | A | | 10/1997 | Latting et al. ................. 71/49 |
| 5,874,096 | A | | 2/1999 | Hazen ......................... 424/405 |
| 5,906,962 | A | | 5/1999 | Pallas et al. ................. 504/116 |
| 5,964,917 | A | | 10/1999 | Latting ........................... 71/49 |
| 6,146,570 | A | | 11/2000 | Stern ........................... 264/141 |
| 6,288,010 | B1 | * | 9/2001 | Rose et al. ................... 504/206 |
| 6,423,109 | B1 | * | 7/2002 | Brigance et al. ............... 71/34 |
| 2001/0034304 | A1 | * | 10/2001 | Volgas et al. ............... 504/206 |

FOREIGN PATENT DOCUMENTS

| JP | 52068715 A | * | 6/1977 |
|---|---|---|---|
| JP | 60141693 A | * | 7/1985 |

OTHER PUBLICATIONS

Brochure for "Ferta–Gel™", from internet website: www.g-tozturfservices.com, revised Sep. 2003.*
Ken Cox, Jim Meadows, Frank Sexton, Jared Gratz, and Patrick McMullan, Slide Presentation entitled "Deposition Agents to Enhance Glyphosate Efficacy and Target Deposition", Oct.1998, 24 slides, Norfolk, Virginia.
Kalo, Inc., Kalo Web site, Kalo.com/adjuvants_dryblends.html, visited Sep. 19, 2001.
Kalo, Inc., "Spray Start" Advertisement, AG Retailer, Jan. 1999, 1 page, USA.
Exacto, Inc., "Polytex DC AMS Dry Ammonium Sulfate/ Drift Retardant Adjuvant System" Promotional Materials, Dec. 2000, 6 pages, USA.
INTEC, "Array Target Performance Adjuvant" Advertisement, 1996, 2 pages, USA.
Exacto, Inc., Slide Presentations entitled "Polytex," Dec. 2000, 14 slides, USA.

* cited by examiner

*Primary Examiner*—C. Sayala
(74) *Attorney, Agent, or Firm*—Stinson Morrison Hecker LLP

(57) ABSTRACT

The present invention is directed to a combination adjuvant comprising an ammonium sulfate fertilizer impregnated with a drift reducing agent. The drift reducing agent is preferably polyacrylamide. Anti-caking and drying agents are preferably added to the combination adjuvant to provide ease of use and prevent caking and agglomeration of the adjuvant. The combination adjuvant is formed by mixing a liquid drift reducing agent with dry ammonium sulfate granules. Any additional agents are added and mixed with the drift reducing agent and ammonium sulfate. Because each granule comprises approximately the same amount of drift reducing agent, the composition of the combination adjuvant is uniform, even after storage and transport.

20 Claims, No Drawings

COMBINATION AMMONIUM SULFATE/ DRIFT REDUCING ADJUVANT AND WET BOND PROCESS FOR MAKING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is directed to the field of spray adjuvants. More specifically, the present invention is directed to a spray adjuvant comprising both a fertilizer and drift reducing agent.

2. Description of Related Art

Agrochemicals, such as herbicides, insecticides, fungicides and other crop protection chemicals frequently require the presence of adjuvants to achieve maximum, or even acceptable, performance. The term "adjuvant" includes any ingredient added to an agrochemical to aid or modify the action of the agrochemical, or to alter the physical characteristics of an agrochemical spray composition, including, but not limited to, formulation aids. Generally, the agrochemical, adjuvants and water are mixed in a tank to form an agrochemical spray composition, which is sprayed onto a target area, such as a field.

There are many types of adjuvants. Drift reducing agents are adjuvants that modify the drift and deposition characteristics of the agrochemical spray composition. Drift, a longtime problem with agrochemical spray compositions, is a function of water droplet size. As a result of drift, the agrochemical spray composition is carried away from its intended target, resulting in wasted product, unintended treatment of border crops that may be damaged by the composition and potential air, ground and water pollution. It is generally agreed that droplets with diameters of 100 microns or less are most susceptible to drifting off target. Droplets with diameters over 100 microns are more likely to produce even spray patterns that uniformly cover the target area, with little drift. Most drift reducing agents generally increase the viscosity of the agrochemical spray composition, which increases droplet size, decreases drift and increases deposition of the agrochemical spray composition on the target. However, if the viscosity is too high, the agrochemical spray composition will not be applied evenly. Rather, the spray pattern will comprise streaks of heavy and light application within the target area, which can damage the over-sprayed plants and reduce insect or weed control in the under-sprayed areas.

Known drift reducing agents include natural gums, such as guar gum and its derivatives, and synthetic polymers, such as polyacrylamide, polyethylene oxide and polyvinylpyrrolidones. Synthetic polymers may be supplied to the end user in an organic carrier solvent for addition to the agrochemical spray composition in the tank. Use of the organic solvent can limit the dispersibility of the polymer and requires the end user to deal with the potential problems associated with a volatile organic compound. Other synthetic polymers are provided in a dry flowable form. The dry flowable polymers must swell upon mixing in the tank to increase the viscosity of the agrochemical spray composition. Such dry flowable polymers often cause nozzle and/or filter clogging during application and are generally recognized to produce an adverse spray pattern uniformity that increases the likelihood of inconsistent pesticide coverage.

Other types of adjuvants are anti-foam and de-foaming agents. In many agrochemical spray composition, substantial foaming occurs in the spray tank during mixing and application of the composition. For example, the herbicide glyphosate, sold under the trademark "ROUNDUP ULTRA," includes surfactants that create foam in the tank mix. It is desirable to include an adjuvant to help prevent the foam from forming or to knock down existing foam. Antifoam agents are adjuvants designed to be added to the tank mix to prevent foam in the spray tank, whereas de-foaming agents are adjuvants designed to knockdown foam once it has developed in the spray tank. Some antifoam agents provide knockdown ability and can be used for both purposes. When used herein, the term "antifoam agents" generally refers to agents that prevent and/or knockdown foam.

Yet another category of adjuvants are activator adjuvants, which enhance the biological performance of the agrochemical spray composition. Activation adjuvants include water-soluble nitrogen-based fertilizers, such as ammonium sulfate. Ammonium-containing fertilizers reduce the pH of the agrochemical spray composition, improving uptake on certain weed species.

Ammonium-containing fertilizers, in particular ammonium sulfates, are particularly useful in enhancing herbicide efficacy. The sulfate portion released by ammonium sulfate "conditions" the water of the agrochemical spray composition by binding hard water minerals such as calcium, sodium, iron and magnesium and thereby preventing such minerals from antagonizing the herbicide. This is particularly true when used with glyphosate herbicides or other weak acid herbicides. It is believed that the ammonium ion enhances glyphosate performance by binding with the glyphosate to form a more soluble, readily absorbed glyphosate-ammonium complexes. Glyphosate-sodium and glyphosate-calcium complexes are less soluble and therefore not as readily absorbed. The sulfate ions released by the ammonium sulfate precipitate the sodium and other hard water minerals, leaving the glyphosate molecules free to bond with the ammonium ions. Larger amounts of ammonium sulfate are required when harder water sources are used in the agrochemical spray composition of certain herbicides. Additionally, ammonium-containing fertilizers increase the absorption of agrochemicals into target plants by stimulating growth of the plant, and aiding uptake into the phloem so that the agrochemicals can be translocated.

Fertilizer grade ammonium sulfate is generally comprised of large particles that are difficult to dissolve in agrochemical spray compositions and may contain insoluble impurities that can damage spray equipment and clog spray nozzles. As a result, ammonium sulfate is often processed before it can be used as an adjuvant in agrochemical spray compositions. Dry ammonium sulfate can be screened to a smaller particle size that will disperse more quickly when mixed in the spray tank. During the screening and handling process, the material is screened for impurities. Alternatively, the ammonium sulfate may be pre-solubilized in water and packaged into liquid containers, during which process it is filtered to remove impurities. However, because the holding capacity of water is limited, in order to achieve the high rates of ammonium sulfate often needed, an unacceptably large amount of product is required, and end-users must dispose of the bulky liquid containers.

If end-users wish to use multiple adjuvants, they are required to measure the appropriate amounts of the individual adjuvants, agrochemical and water, and mix the components in the tank to form the agrochemical spray composition. The end-user must ensure that the amount of the components are correct, the materials are compatible and properly dispersed, and proper safety precautions are followed. Because this can be a complicated and time consuming task, there is a need for adjuvant products that combine two or more adjuvants to simplify preparation of the agrochemical spray composition.

One known method for providing a combination adjuvant involves dry blending two types of adjuvants, such as a fertilizer and a dry drift reducing agent. However, because the fertilizer particles are generally larger than those of the drift reducing agent, the particles separate during shipment, such that the mixture does not have a uniform composition. To assure the separate components stay mixed, it is known to grind the two materials to similar sizes, so that they will not segregate during shipping and handling. However, grinding to a small particle size results in a fine-dusty end product that is difficult for the end-user to use. Further, finely ground dry drift reducing agents take considerable time to hydrate and achieve the desired viscosity. When the drift reducing agent does not hydrate quickly enough, it can agglomerate and plug screens and nozzles during application.

Ammonium sulfate is commonly used as an activator adjuvant to enhance the performance of herbicides, particularly glyphosate. Commercial brands of glyphosate, such as that sold under the name "ROUNDUP," recommend varying rates at which the ammonium sulfate should be used in association with the product, referred to as "use rates." Thus, it is desirable for any combined fertilizer and drift reducing product to be useful over the entire range of the recommended ammonium sulfate use rates. However, as more ammonium sulfate is added to the agrochemical spray composition, more drift reducing agent is added. As a result, when large amounts of fertilizer are added, too much drift reducing agent is added, resulting in a composition with a viscosity that is too high for proper application. If the amount of drift reducing agent in the blend is reduced, it will not provide sufficient drift reduction at low use rates. Thus, when the drift reducing agent is dry blended with the fertilizer, the range of use rates for the blended product is limited.

Thus, a need remains for a single product that supplies two or more types of adjuvants, and can be used over a wide range of use rates, without the problems associated with dry blended adjuvant mixtures.

SUMMARY OF THE INVENTION

The present invention is directed to a combination adjuvant comprising a fertilizer and a drift reducing agent, wherein the fertilizer granules are impregnated with the drift reducing agent. In a most preferred embodiment, the combination adjuvant also comprises a drying agent and an anti-caking agent. The combination adjuvant may additionally comprise an anti-foam agent.

The combination adjuvant is formed by a wet bond process, wherein the fertilizer is uniformly mixed with a liquid drift reducing agent. In this wet bonding process, the liquid drift reducing agent is able to penetrate the fertilizer granules, and thereby impregnates the outer portion of the granules with the drift reducing agent. However, it is possible that the drift reducing agent simply binds to the exterior of the fertilizer granules. For the sake of clarity, when used herein, "impregnated" fertilizer granules refers to fertilizer granules to which a liquid drift reducing agent has been applied, regardless of whether the drift reducing agent actually penetrates, or is simply bound to, the fertilizer granules. In addition, "granules" refer to the particles that make up the fertilizer, regardless of shape or size.

In the wet bond process of the present invention, the fertilizer and liquid drift reducing agent are preferably mixed until thoroughly blended for at least approximately three minutes. If additional adjuvants and/or formulation aids are desired, they are added to the combined fertilizer and drift reducing agent and mixed further. The additional adjuvants may be in dry form, which are dry blended with the polyacrylamide-impregnated ammonium sulfate particles and/or bonded to the ammonium sulfate granules via the liquid polyacrylamide. Alternatively, the additional adjuvants may be in liquid form, which can penetrate and impregnate the ammonium sulfate granules.

In a preferred embodiment, the fertilizer is ammonium sulfate. Because ammonium sulfate has very little absorbency, only a small amount of the liquid drift reducing agent can be absorbed by the ammonium sulfate granules. Therefore, the drift reducing agent must be effective in small amounts. In addition, insofar as many ammonium sulfate applications require wide ranges of ammonium sulfate content, the drift reducing agent impregnated within the ammonium sulfate must also be effective over a wide range of use rates, and must be present in the combination adjuvant in an amount that will be effective throughout the use range for the ammonium sulfate. Preferred drift reducing agents to achieve these characteristics are synthetic polymers, more preferably synthetic polymers selected from the group consisting of anionic polyacrylamides; non-ionic polyacrylamides; cationic polyacrylamides; polymers of acrylic acid; copolymers of acrylic acid; methacrylic acids and their salts; methylacrylamides and their copolymers, derivatives and mixtures thereof; polyacrylonitrile, its hydrolysis products, and copolymers, derivatives and mixtures thereof; polymers of ethylene oxides; and polymers of alkylene oxides. Anionic polyacrylamide is the most preferred drift reducing agent. To achieve the preferred amount of drift reducing agent in the combination adjuvant, an undiluted drift reducing agent preferably comprises between 0.01 and 25 weight percent, more preferably between 0.01 and 5 weight percent, of the total weight of the components blended to form the combination adjuvant.

In a preferred embodiment, the combination adjuvant further comprises a drying agent and/or anti-caking agent. Ammonium sulfate impregnated with a drift reducing agent will provide drift reduction and enhance the performance of the agrochemical spray composition. However, due to the characteristics of the ammonium sulfate and the addition of the liquid drift reducing agent, the ammonium sulfate granules can become tacky and/or cake, preventing easy flow and complete dissolution of the combination adjuvant and causing the combination adjuvant to agglomerate and clog spray nozzles during application. Therefore, to improve the ease of use and dissolution, and to prevent nozzle clogging, use of a drying agent and an anti-caking agent is preferred. Furthermore, although use of drying and anti-caking agents is known in the art, the present invention comprises types and amounts of drying and anti-caking agents that have been found to optimize the characteristics of the novel combination adjuvant.

To reduce tackiness and enhance flow of the combination adjuvant, the combination adjuvant of the present invention preferably comprises a drying agent selected from the group consisting of sodium sulfate, calcium bentonite, diatamaceouos silica, polyethylene glycol (flakes, prill or powder), calcium silicate, magnesium silicate, aluminum silicate, sodium silicate, polyvinylpyrrolidone, polysaccharide, free flowing silica, mica, cellulose powder, kraft lignin, lignosulfonates, sulfosuccinates, sodium salt of polymerized naphthalene sulfonic acid, sodium salt of carboxylated polyelectrolyte, POE stearates, dioleates, sodium butyl naphthalene sulfonates, sodium sulfonate of naphthalene formaldehyde condensate, di-n-butyl sodium naphthalene sulfonate, di-isopropyl sodium naphthalene sulfate, sodium dodecylbenzene sulfonate, polyacrylates, polycarboxylates, solid block co-polymers, POE lauryl alcohol and sorbitan stearates, preferably sodium sulfate, most preferably anhydrous sodium sulfate. Preferably the drying agent comprises between 0.01 and 20 weight percent of the components blended to form the combination adjuvant.

The most-preferred anti-caking agent for use with the present invention is silicon dioxide. Other preferred anti-caking agents are selected from the group consisting of tricalcium phosphate, silicas (fumed or free flowing), hydrophobic starch derivatives, powdered cellulose, calcium silicate, magnesium silicate, aluminum silicate, sodium silicate, polyacrylic acid and sodium salts thereof, and sodium polyalkyl naphthalene sulfonate. Preferably the anti-caking agent comprises between 0.01 and 20.0 weight percent of the components blended to form the combination adjuvant.

An anti-foam agent may also be added to the combination adjuvant.

In the preferred embodiment, the combination adjuvant of the present invention is dry and free flowing and, when the preferred drying agent and anti-caking agents are added, the combination adjuvant remains free flowing, and does not cake, during transport and storage. The combination adjuvant is readily dispersible in water with minimal agitation. It may be added to the spray tank with the desired agrochemical, preferably glyphosate, and mixed to form an agrochemical spray composition.

The combination adjuvant of the present invention has a nearly equal amount of drift reducing agent impregnated into each of the fertilizer granules, which results in uniform proportions of fertilizer and drift reducing agent throughout the combination adjuvant product. As a result, even after shipment and storage, the combination adjuvant contains the appropriate proportions of fertilizer adjuvant and drift reducing agent throughout the product. Further, because the drift reducing agent is impregnated within the ammonium sulfate granules, the combination adjuvant dissolves more readily and uniformly than dry blended combination products.

Further, in the preferred embodiment, the combination adjuvant of the present invention can be used to provide a wide range of ammonium sulfate to the agricultural spray composition, preferably including use rates between 8 and 32 pounds per 100 gallons, or up to 3 pounds per acre at a 10 gallon spray carrier per acre use rate, more preferably including use rates from 8.5 pounds to 18 pounds per 100 gallons, or 1–2 pounds per acre at a 10 gallon spray carrier per acre use rate, without adversely affecting the spray pattern of the agrochemical spray composition.

DETAILED DESCRIPTION OF THE PREFERRED EMBODIMENT

The combination adjuvant of the present invention comprises a fertilizer, preferably ammonium sulfate, impregnated with a drift reducing agent, preferably a polyacrylamide. Preferably the combination adjuvant comprises additional adjuvants and/or formulation aids selected from the group consisting of a drying agent, an anti-caking agent and an anti-foam agent. More preferably the combination adjuvant of the present invention comprises a fertilizer impregnated with a drift reducing agent combined with a drying agent, more preferably combined with a drying agent and an anti-caking agent and most preferably combined with a drying agent, an anti-caking agent and an anti-foam agent.

The combination adjuvant of the present invention is formed by mixing a liquid drift reducing agent with a dry fertilizer adjuvant, such that the drift reducing agent is impregnated within the outer portion of the fertilizer adjuvant granules. The liquid drift reducing agent and ammonium sulfate are mixed until thoroughly blended, preferably for at least three minutes.

The preferred liquid drift reducing agent is a concentrated polyacrylamide emulsion and the preferred fertilizer adjuvant is ammonium sulfate. The polyacrylamide emulsion and ammonium sulfate preferably are mixed in a horizontal double ribbon blender. Although a double ribbon blender is preferred, any standard ribbon mixer, vertical mixer or Doyle type mixer with rotary flutes, or any other equipment that will evenly blend the dry and liquid components can be used consistent with the present invention. In a most preferred embodiment, spray treating equipment, including air pressurized nozzle, hose and canister device are used to blend the liquid polyacrylamide with the ammonium sulfate. Preferably the fertilizer comprises 1.0 to 99.99 weight percent of the components added to the blender, more preferably 92.0 to 98 weight percent, and the liquid drift reducing agent comprises between 0.01 and 25 weight percent, more preferably 0.01 to 5 weight percent.

In a preferred embodiment, additional adjuvants are mixed with the polyacrylamide emulsion and ammonium sulfate after the ammonium sulfate is impregnated with the polyacrylamide. Preferably any desired adjuvant and/or formulation aid is added individually, and mixed until thoroughly blended, preferably for about three minutes. In a most preferred embodiment, a drying agent, preferably sodium sulfate, is added and mixed for about three minutes, then an anti-caking agent, preferably silicon dioxide, is added and mixed for about three minutes, followed by adding an antifoam agent and blending for about three minutes. Preferably, the drying agent, anti-caking agent and anti-foam agent are provided in dry form. Preferably the drying agent comprises between 0.01 and 20.0 weight percent of the total components added to the blender, more preferably between 0.01 and 8.0 weight percent; the anti-caking agent comprises between 0.01 and 20.0 weight percent, more preferably between 0.01 and 2.0 percent, and the anti-foam agent comprises between 0.01 and 5.0 weight percent of the total components added to the blender, more preferably between 0.01 and 1.5 weight percent, most preferably between 0.001 and 0.75 weight percent.

The resulting product is a crystalline powder, wherein each granule of the powder is impregnated with approximately the same amount of polyacrylamide, to result in a combination adjuvant with a uniform composition, that maintains the uniform composition during shipment and storage.

The fertilizer of the present invention is preferably a water-soluble nitrogen-based fertilizer, more preferably ammonium sulfate. The ammonium sulfate particles are sufficiently large to produce very little dust, but sufficiently small to dissolve easily in water when mixing the agrochemical spray composition. Preferably the ammonium sulfate particles are between +14 and +120, more preferably between +16 and +65, and most preferably between +28 and +48, as determined with a W. S. Tyler Mesh Sieve by ASTM E-11 standards. Ammonium sulfate consistent with the present invention is sold by American Plant Foods of Galena Park, Tex. under the name "SPRAYABLE AMMONIUM SULFATE," by Martin Resources of Plainview, Tex. under the name "AMMONIUM SULFATE," and by Allied Signal of Hopewell, Va., under the name "SULF-N 45."

The drift reducing agent of the combination adjuvant is most preferably anionic polyacrylamide. Other preferred drift reducing agents are synthetic polymers, more preferably the synthetic polymer is selected from the group consisting of anionic polyacrylamides; nonionic polyacrylamide(s); cationic polyacrylamide(s); polymers of acrylic acid; copolymers of acrylic acid; methacrylic acids and their salts; methylacrylamides and their copolymers, derivatives and mixtures thereof; polyacrylonitrile, its hydrolysis products, and copolymers, derivatives and mixtures thereof; polymers of ethylene oxides; and polymers of alkylene oxides.

The drift reducing agent is provided in a liquid form, preferably as a concentrated emulsion. For the sake of clarity, the term "liquid," when used before polyacrylamide or drift reducing agent refers to any solution of, emulsion of, or other liquid containing polyacrylamide or drift reducing agent, respectively. Anionic polyacrylamides consistent with the present invention are sold by Exacto, Inc. of Richmond, Ill. under the name "POLYTEX A 363" and by Nalco Chemical of Naperville, Ill. under the name "NALCO-TROL." By adding the polyacrylamide in a liquid form, the polyacrylamide is impregnated within the outer portion of the ammonium sulfate granules, which results in a combination adjuvant with a uniform composition that mixes and dissolves easily. Thus, the combination adjuvant formed through the wet bond process overcomes the difficulties with prior art dry blended polymers that evoke a lower, and therefore less desirable, hydration rate, create an increased likelihood of clogging spray nozzles and are restricted to a very narrow effective usage rate.

Dry ammonium sulfate has very little absorbency. Therefore, the drift reducing agent must be effective in small amounts, so that only a small amount of liquid must be applied to and impregnated with the ammonium sulfate. If too much liquid is added to the ammonium sulfate, the resulting material would be tacky, preventing free flow of the combination adjuvant. The preferred drift reducing agents of the present invention provide the desired viscosity modification with only a small amount of adjuvant. Preferably, the liquid drift reducing agent comprises 0.01 to 25.0 weight percent, more preferably between 0.01 and 5.0 weight percent, of the components blended to form the combination adjuvant. Because the ammonium sulfate has little absorbency, the liquid drift reducing agent will only penetrate the outer portion of the ammonium sulfate granules and generally will not reach the center. Thus, although a uniform amount of drift reducing agent is impregnated with each granule, the drift reducing agent is not dispersed uniformly throughout the granules, but rather, is contained wholly, or in a higher concentration, in the outer portion of the granules.

For the combination adjuvant of the present invention to be effective over a wide range of use rates, the drift reducing adjuvant must be able to deliver the appropriate viscosity modification at a range of use rates, wherein the amount of adjuvant may double from the lowest use range to the highest use range. For example, glyphosate sold under the trademark "ROUNDUP" recommends use rates for ammonium sulfate that range between 8.5 to 17 pounds per 100 gallons. Because the drift reducing adjuvant is impregnated within the ammonium sulfate, if the amount of ammonium sulfate doubles, so will the amount of drift reducing agent. The preferred polymers of the present invention supply the desired viscosity over a wide range of use rates, such that the combination adjuvant generally can be used to supply the full range of ammonium sulfate use rates recommended for use with herbicides, such as glyphosate.

The combination adjuvant preferably comprises a drying agent, also referred to in the art as a flow agent or moisture scavenger, which keeps the combination adjuvant free flowing and easy to mix. In the absence of a drying agent, the liquid added with the drift reducing agent will cause the combination adjuvant to be tacky, such that it will not flow freely out of the bag. Thus, the ease of use depends in part on the amount and type of drying agent used. Addition of a drying agent also allows the addition of more liquid drift reducing adjuvant, while still maintaining a dry finished product. Preferably, the drying agent comprises between 0.01 and 20.0 weight percent of the total compounds, most preferably 0.01 and 8.0 weight percent.

The most preferred drying agent is anhydrous sodium sulfate. Sodium sulfate acts as a moisture scavenger that reduces the hygroscopic tendencies that would otherwise affect performance of the combination adjuvant by agglomerating the combination adjuvant, impeding dissolution of the adjuvant and clogging spray nozzles. Other preferred drying agents are selected form the group consisting of calcium bentonite, diatamaceouos silica, polyethylene glycol (flakes, prill or powder), calcium silicate, magnesium silicate, aluminum silicate, sodium silicate, polyvinylpyrrolidone, polysaccharide, free flowing silica, mica, cellulose powder, kraft lignin, lignosulfonates, sulfosuccinates, sodium salt of polymerized naphthalene sulfonic acid, sodium salt of carboxylated polyelectrolyte, POE stearates, dioleates, sodium butyl naphthalene sulfonates, sodium sulfonate of naphthalene formaldehyde condensate, di-n-butyl sodium naphthalene sulfonate, di-isopropyl sodium naphthalene sulfonate, sodium dodecylbenzene sulfonate, polyacrylates, polycarboxylates, solid block co-polymers, POE lauryl alcohol and sorbitan stearates. Drying agents consistent with the present invention are sold by Brenntag Great Lakes, LLC of Chicago, Ill. under the name "SODIUM SULFATE, STANDARD GRADE."

The preferred embodiment of the invention additionally comprises an anti-caking agent to prevent caking and agglomeration. Ammonium sulfate by itself will tend to cake or agglomerate, which is worsened by the addition of a liquid drift reducing adjuvant. The condition is further worsened as the adjuvant is stored. Thus, in a preferred embodiment of the invention, an anti-caking agent is added to increase the shelf life of the product. The most preferred anti-caking formulation aid is silicon dioxide. Other preferred anti-caking agents include tricalcium phosphate, silicas (fumed or free flowing), hydrophobic starch derivatives, powdered cellulose, calcium silicate, magnesium silicate, aluminum silicate, sodium silicate, polyacrylic acid and sodium salts thereof, and sodium polyalkyl naphthalene sulfonate. Preferably the anti-caking adjuvant comprises between 0.01 to 20.0 weight percent of the components blended to form the combination adjuvant, more preferably between 0.01 and 2.0 weight percent. Anti-caking agents consistent with the present invention include "HI-SIL ABS" sold by PPG Industries of Pittsburgh, Pa.

The combination adjuvant of the present invention may also contain an anti-foam agent. However, the anti-foam agent may be omitted from the combined adjuvant, and applied to the tank mix separately, without adversely affecting the physical properties of the combined adjuvant. In the preferred embodiment, the anti-foam agent comprises between 0.01 and 5.0 weight percent, more preferably between 0.01 and 1.5 weight percent and most preferably between 0.001 and 0.75 weight percent, of the components blended to form the combination adjuvant. Anti-foam agents consistent with the present invention are sold by Magrabar Chemical Corporation of Morton Grove, Ill., under the names "MD-1343" and MD-2454", and by Exacto, Inc. of Richmond, Ill., under the name "SILEX DC 3018."

The wet bond process of the present invention produces a combination adjuvant with a uniform composition that is easy to dissolve and mix. Further, the combination adjuvant comprises a novel combination of drift reducing agent, drying agent and anti-caking agent such that in normal use, it is free flowing, easy to use, does not cake, can be used over a wide range of use rates, and retains these properties even after transport and storage.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A combination adjuvant, comprising:
   a plurality of water-soluble nitrogen-based fertilizer granules; and
   a drift reducing agent;
   wherein said drift reducing agent is a liquid impregnated within the outer portion of said granules, and
   wherein said combination adjuvant is dry and free flowing.

2. The combination adjuvant as claimed in claim 1, wherein said fertilizer granules are ammonium sulfate granules.

3. The combination adjuvant as claimed in claim 2, wherein said drift reducing agent is selected from the group consisting of anionic polyacrylamide; non-ionic polyacrylamides; cationic polyacrylamides; polymers of acrylic acid; copolymers of acrylic acid; methacrylic acids and their salts; methylacrylamides and their copolymers, derivatives and mixtures thereof; polyacrylonitrile, its hydrolysis products, and copolymers, derivatives and mixtures thereof; polymers of ethylene oxides; and polymers of alkylene oxides.

4. The combination adjuvant as claimed in claim 3, wherein said drift reducing agent is polyacrylamide.

5. The combination adjuvant as claimed in claim 4, wherein said drift reducing agent is anionic polyacrylamide.

6. The combination adjuvant as claimed in claim 3, further comprising a drying agent selected from the group consisting of sodium sulfate, calcium bentonite, diatamaceouos silica, polyethylene glycol flakes, polyethylene glycol, polyethylene glycol flakes, polyethylene glycol prill, polyethylene glycol powder, calcium silicate, magnesium silicate, aluminum silicate, sodium silicate, polyvinylpyrrolidone, polysaccharide, free flowing silica, mica, cellulose powder, kraft lignin, lignosulfonates, sulfosuccinates, sodium salt of polymerized naphthalene sulfonic acid, sodium salt of carboxylated polyelectrolyte, POE stearates, dioleates, sodium butyl naphthalene sulfonates, sodium sulfonate of naphthalene formaldehyde condensate, di-n-butyl sodium naphthalene sulfonate, di-isopropyl sodium naphthalene sulfonate, sodium dodecylbenzene sulfonate, polyacrylates, polycarboxylates, solid block co-polymers, POE lauryl alcohol and sorbitan stearates.

7. The combination adjuvant as claimed in claim 6, wherein said drying agent is sodium sulfate.

8. The combination adjuvant as claimed in claim 3, further comprising an anti-caking agent selected from the group consisting of silicon dioxide, tricalcium phosphate, , silicas, fumed silicas, free flowing silicas, hydrophobic starch derivatives, powdered cellulose, calcium silicate, magnesium silicate, aluminum silicate, sodium silicate, polyacrylic acid and sodium salts thereof, and sodium polyalkyl naphthalene sulfonate.

9. The combination adjuvant as claimed in claim 8, wherein said anti-caking agent is silicon dioxide.

10. The combination adjuvant as claimed in claim 6, further comprising an anti-caking agent, selected from the group consisting of silicon dioxide, tricalcium phosphate, silicas, fumed silicas, free flowing silicas, hydrophobic starch derivatives, powdered cellulose, calcium silicate, magnesium silicate, aluminum silicate, sodium silicate, polyacrylic acid and sodium salts thereof, and sodium polyalkyl naphthalene sulfonate.

11. A combination adjuvant, comprising:
    a plurality of ammonium sulfate granules;
    a polyacrylamide drift reducing agent, wherein said polyacrylamide drift reducing agent is a liquid impregnated within the outer portion of said ammonium sulfate granules;
    sodium sulfate; and
    silicon dioxides,
    wherein said combination adjuvant is dry and free flowing.

12. A method for making a combination adjuvant, comprising the steps of:
    providing a liquid drift reducing agent;
    providing dry ammonium sulfate granules; and
    mixing said liquid drift reducing agent with said ammonium sulfate granules until thoroughly mixed to form an ammonium sulfate/drift reducing agent mixture.

13. The method as claimed in claim 12, wherein said liquid drift reducing agent comprises between 0.01 and 5.0 weight percent of the ammonium sulfate/drift reducing agent mixture.

14. The product produced according to the method of claim 12.

15. The method as claimed in claim 12, further comprising the steps of:
    adding to said ammonium sulfate/drift reducing mixture a drying agent selected from the group consisting of sodium sulfate, calcium bentonite, diatamaceouos silica, polyethylene glycol, polyethylene glycol flakes, polyethylene glycol prill, polyethylene glycol powder, calcium silicate, magnesium silicate, aluminum silicate, sodium silicate, polyvinylpyrrolidone, polysaccharide, free flowing silica, mica, cellulose powder, kraft lignin, lignosulfonates, sulfosuccinates, sodium salt of polymerized naphthalene sulfonic acid, sodium salt of carboxylated polyelectrolyte, POE stearates, dioleates, sodium butyl naphthalene sulfonates, sodium sulfonate of naphthalene formaldehyde condensate, di-n-butyl sodium naphthalene sulfonate, di-isopropyl sodium naphthalene sulfonate, sodium dodecylbenzene sulfonate, polyacrylates, polycarboxylates, solid block co-polymers, POE lauryl alcohol and sorbitan stearates; and mixing said drying agent with said ammonium sulfate/drift reducing agent mixture.

16. The method as claimed in claim 15, further comprising the steps of:

adding to said ammonium sulfate/drift reducing agent mixture an anti-caking agent selected from the group consisting of silicon dioxide, tricalcium phosphate, silicas, fumed silicas, free flowing silicas, hydrophobic starch derivatives, powdered cellulose, calcium silicate, magnesium silicate, aluminum silicate, sodium silicate, polyacrylic acid and sodium salts thereof, and sodium polyalkyl naphthalene sulfonate; and mixing said anti-caking agent with said ammonium sulfate/drift reducing agent mixture and said drying agent to form adjuvant mixture.

17. The product produced according to the method of claim 16.

18. The method as claimed in claim 16, wherein said liquid drift reducing agent is liquid polyacrylamide.

19. The method as claimed in claim 18, wherein said drying agent comprises between 0.01 and 20.0 weight percent of said adjuvant mixture and said anti-caking agent comprises between 0.01 and 0.0 weight percent of said adjuvant mixture.

20. The product produced recording to the method of claim 19.

* * * * *